United States Patent [19]

Winer

[11] Patent Number: 4,677,747
[45] Date of Patent: Jul. 7, 1987

[54] VEGETATION STEM CUTTING APPARATUS

[76] Inventor: Brian A. Winer, P.O. Box 960, Sandton 2144 Transvaal, South Africa

[21] Appl. No.: 839,169

[22] Filed: Mar. 13, 1986

[51] Int. Cl.⁴ .................... B26B 17/00; B26B 13/26
[52] U.S. Cl. ..................................... 30/124; 30/179; 30/238
[58] Field of Search ................. 30/124, 178, 179, 181, 30/191, 192, 187, 188, 229, 238, 251, 341, 349

[56] References Cited

U.S. PATENT DOCUMENTS

| 634,607 | 10/1899 | Bowers | 30/238 |
| 2,349,734 | 5/1944 | Jaume | 30/332 |
| 3,936,935 | 2/1976 | Gregory | 30/179 |
| 4,336,652 | 6/1982 | Robertson | 30/341 X |
| 4,394,796 | 7/1983 | Winer | 30/178 |
| 4,525,929 | 7/1985 | Brophy et al. | 30/192 X |

FOREIGN PATENT DOCUMENTS 2540478 3/1977 Fed. Rep. of Germany ........ 30/178

Primary Examiner—E. R. Kazenske
Assistant Examiner—Michael D. Folkerts
Attorney, Agent, or Firm—William W. Haefliger

[57] ABSTRACT

Cutting apparatus comprises a pair of elongated limbs extending in the same general direction and operatively connected to each other by connecting means which guide the limbs for movement towards and away from each other and simultaneously in a generally longitudinal direction relative to each other, one limb adapted to carry a cutting blade having a cutting edge directed towards a support surface provided on the other limb, the support surface and blade being adapted to cooperate upon relative movement of the limbs to provide a cutting action.

11 Claims, 4 Drawing Figures

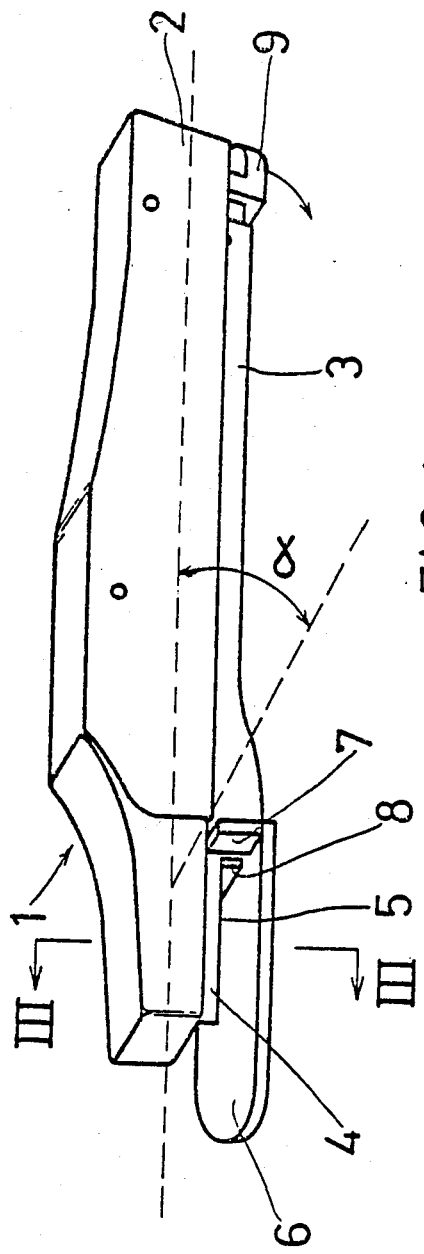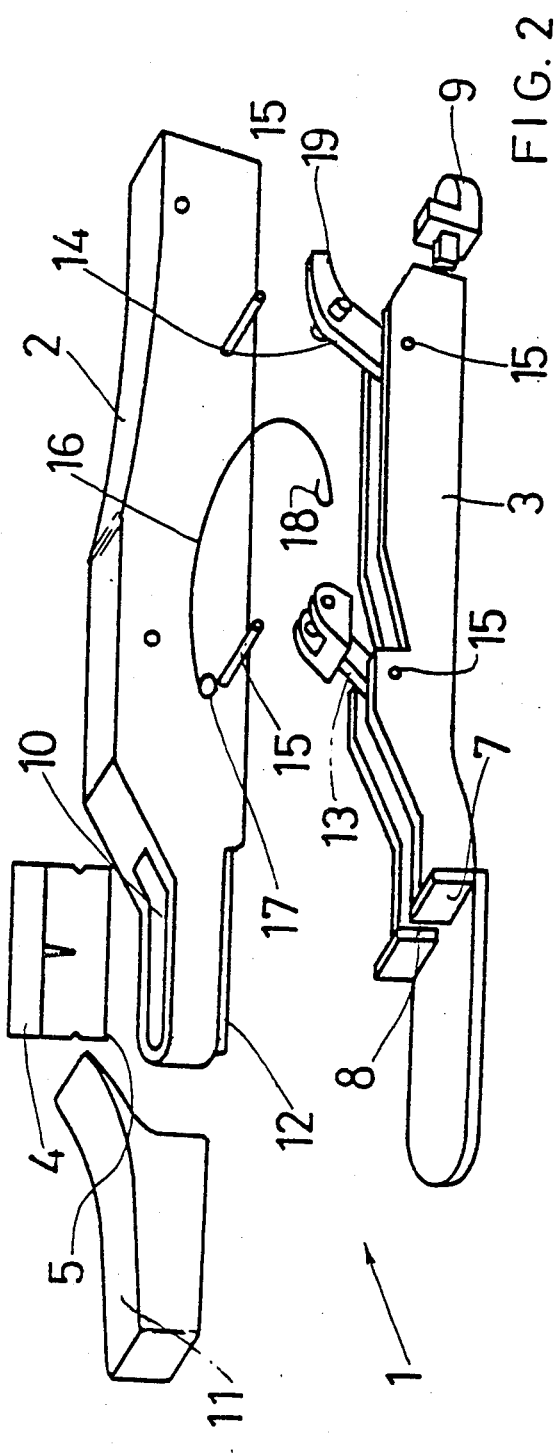

VEGETATION STEM CUTTING APPARATUS

FIELD OF THE INVENTION

This invention relates to a cutting apparatus particularly adapted to cut plant stems, such as flower stems and foliage stems, in the preparation of cut flower arrangements or, in the propagation of plants by rooting, or to prune plants and small shrubs.

BACKGROUND TO THE INVENTION

Such an apparatus is known wherein a pair of tongs is interconnected at a pivot and a first tong carries a table which serves as a cutting surface and the second tong carries a knife which is urged, in use, towards the table of the first tong. The knife thus meets said table surface non-perpendicularly in cross-section and is received in a groove therein so that a plant stem supported on said table or cutting surface is cut non-perpendicularly relative to the plant stem axis.

The advantages provided by such an apparatus include a non-transversely compressive clean cutting action, thereby substantially avoiding the problem of blockage of plant stems which may arise from using scissors which apply such transverse compressive force. A non-perpendicular cut also serves to increase in the surface area of the stem which becomes exposed after cutting. Both these advantages permit a stem cut by said apparatus to absorb water more easily. However, such an apparatus is often difficult to use.

The object of the present invention is to provide a cutting apparatus suitable for cutting plant stems and the like which cuts stems in a manner which provides the abovementioned advantages and which is constructed in a manner which facilitates cutting.

SUMMARY OF THE INVENTION

According to this invention there is provided cutting apparratus comprising a pair of elongate limbs extending in the same general direction and operatively connected to each other by connecting means which guide the limbs for movement towards and away from each other and simultaneously in a generally longitudinal direction relative to each other, and where one limb is adapted to carry a cutting blade having a cutting edge directed towards a support surface provided on the other limb, the support surface and blade being adapted to co-operate upon relative movement of the limbs to provide a cutting action.

Further features of the invention provide for the limbs to be substantially parallel to each other and for the connecting means to guide the limbs for movement in a plane co-planar to the limb axes. The support surface may lie in a plane which is perpendicular to the abovementioned plane but may also be inclined thereto. It may further be adjustable between perpendicular and inclined positions.

Still further features of the invention provide for the means connecting the limbs to comprise at lest one connecting piece which is articulately or pivotally attached to each limb or, alternatively, to comprise at least one transverse connecting pin which is fixed relative to one limb and slidably movable in suitable guides provided in the other limb.

Still more features of the invention provide for the cutting blade to be received with its cutting edge in the plane of relative movement of the limbs; for the cutting blade to be removable from the associated limb; for a limb adapted to receive a removable cutting blade to be provided with a removable retaining member for the blade; for the limb carrying the support surface to be additionally provided with a split end wall at right angles to the support surface but inclined to the plane of movement of the limbs and for the inclination between said plane and the split end wall to be preferably about 45°.

According to another aspect of this invention, the apparatus further comprises biasing means for biasing the limbs in an operatively open position with the cutting edge of the blade spaced from the support surface and stop means for restraining the relative motion between the two limbs either partly or completely.

BRIEF DESCRIPTION OF THE DRAWINGS

In order that the invention may be more clearly understood, it will now be described with reference to the accompanying drawings whereof:

FIG. 1 is a perspective view illustrating the general assembly of one embodiment of the invention;

FIG. 2 is a partially exploded view thereof;

DETAILED DESCRIPTION WITH REFERENCE TO THE DRAWINGS

Figure 3:
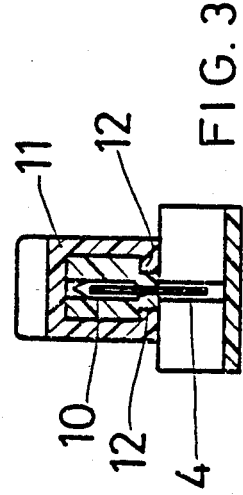
FIG. 3 is a sectional view taken along line III—III in FIG. 1.

The cutting apparatus generally indicated by numeral 1 in FIG. 1 comprises a first elongate handle defining limb 2 and a second elongate handle defining limb 3 lying on an axis parallel to the axis of the first limb 2. The first limb 2 carries a cutting blade 4 at one end thereof having a cutting edge 5 directed towards a table or support surface 6 provided at the adjacent end of the second limb 3.

The second limb 3 is further provided with a split end wall 7 at right angles to the plane of the support surface but inclined to the plane of movement containing the two limbs 2 and 3 at an angle "α" which is, in this case, equal to 45°. This end wall defines a fence against which a stem to be cut can be located to be at the angle "α" to the plane of the blade.

In the partially closed condition of the cutting apparatus 1, illustrated in FIG. 1, the split 8 of the end wall 7 accommodates the lower edge of the cutting blade 4. Locking means 9 are provided at the opposite end of the limb 3 for co-operation with the first limb 2 to hold the apparatus 1 in a substantially closed position with the cutting edge 5 of the blade 4 near to the support surface 6. This position corresponds to a "safe" closed position for storage during periods of non-use.

The cutting apparatus 1 will now be described with particular reference to FIG. 2. A slot 10 is provided in the first end region of the first limb 2 of the apparatus 1 for locating the blade 4 and to facilitate easy replacement thereof. A removable retaining member 11 is provided for retaining the blade 4 in its operative position during use of the cutting apparatus 1. The retaining member 11 is provided with two spaced parallel inwardly directed lips extending parallel to the axis of the retaining member and adapted to co-operate with recessed groove formations 12 provided on the underside of the first limb 2 below the blade receiving slot 10. The co-operating groove formations and lips co-operate with the retaining member to hold the blade in the slot during use thereof.

In this embodiment of the invention, the limbs are connected to each other by means of two spaced parallel connecting pieces 13, 14, each connecting piece being pivotally connected to both the first limb 2 and second limb 3 by means of spaced pivot pins 15. It is understood that the first limb 2 comprises a hollow body of greater internal width than the lower limb 3 in order to accommodate the latter and the connection pieces 13, 14 therein.

The cutting apparatus 1 is further provided with spring biasing means 16 for biasing the limbs into an open position with the cutting edge 5 of the blade 4 sufficiently spaced from the support surface 6 to provide suitable space for receiving an object to be cut.

The spring biasing means may be of any configuration but in this case comprises a length of spring steel wire or blade spring which, in its operative position, is bent over itself and whereof the shape is defined by a "C". A coiled or helical spring may also be employed and even well known axially compressible tubular springs widely used for garden shears may be employed.

In order to retain the particular spring biasing means 16 used in this embodiment in its operative position, it is looped at one end and assembled with the loop surrounding the one pivot pin 15 which retains the first connector piece 13 nearest to the operative cutting area in its operative position relative to the upper limb 2. The first connecting piece is additionally provided with a bifurcated end in order to accommodate the loop 17 of the spring therebetween and to restrain lateral movement thereof. An open loop 18 bent from the opposite end of the spring 16 provides a blunt surface which will not catch the inner surface of the second limb 3 on which the spring 16 rests during use.

The second connecting piece 14 remote from the operative cutting area is provided with stop means 19 adapted to engage the inner surface of the first limb 2 during use of the cutting apparatus 1 thereby limiting the relative motion of the two limbs.

In use, the cutting blade 4 is moved from a closed safety position adjacent to the support surface 6 by releasing the safety locking means 9.

Upon release, the spring biasing means 16 urges the first limb 2 away from the second limb. A plant stem to be cut may then be located on the support surface 6 and may be rested against the inclined end wall 7. Thereafter, movement of the limbs towards each other results in a simultaneous longitudinal movement of one limb relative to the other, and a movement of the blade towards the support surface. The spring biasing means 16 is thereby compressed and the connecting members 13, 14 pivot relative to the limbs 2, 3 causing them to move towards each other in a roughly parallel direction. In this manner, the cutting blade 4 is brought to bear on the object resting on the support surface and the object may be cut. With the object being located against the inclined end wall 7, the cut produced will be at the angle "α" to the axis of the object.

It is to be understood that several variations may be made to the above described embodiment of the invention without departing from the scope thereof. In particular, the connecting means for connecting the limbs in their operative positions may be varied in any suitable manner as long as the relative movement of the limbs is guided for movement towards and away from each other and simultaneously in a generally longitudinal direction.

Figure 4:
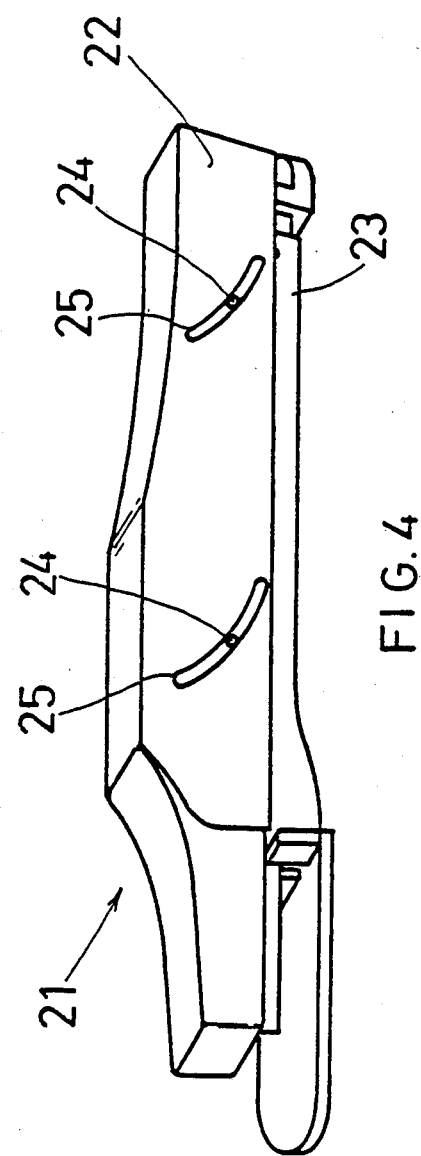
FIG. 4 is a perspective view illustrating an alternative embodiment of the invention.

A possible alternative to the above described embodiment is illustrated in FIG. 4 of the drawings. The cutting apparatus generally indicated by numeral 21 comprises a first limb 22 and a second limb 23 operatively connected to each other by a pair of transverse connecting pins 24 each of which is fixed relative to the second limb 23 and slidably movable in guide slots 25 provided in the first limb 21. The guide slots 25 are inclined to the length of the limbs and may be somewhat arcuate in shape to ensure more of a longitudinal movement near the end of a cutting operation.

The invention thus provides a useful cutting apparatus which is handy and easy to use and which results in an improved cut when compared to many other such apparatus existing at the present time.

I claim:

1. Cutting apparatus comprising a pair of elongate limbs extending in the same general direction and operatively connected to each other by connecting means which guide the limbs for movement towards and away from each other while simultaneously remaining parallel relative to each other, and whereof one limb is adapted to carry a cutting blade having a cutting edge directed towards a support surface provided on the other limb, the support surface and blade being adapted to co-operate upon relative movement of the limbs to provide a cutting action, said other limb carrying the support surface also having a split end wall for accomodating said blade passing through the split thereof, and said one limb which is adapted to carry the cutting blade having a slot therethrough for downwardly receiving the cutting blade, and including a removable retaining member for closing, in the operative position, the side of the slot remote from the cutting surface, the retaining member carried by said one limb for endwise movement thereon into and out of said position in which the closing member is located directly above the split end wall.

2. Cutting apparatus as claimed in claim 1 in which the limbs are substantially parallel to each other.

3. Cutting apparatus as claimed in either of claims 1 or 2 in which the means which guide the limbs are arranged to allow such movement in a plane which includes the limb axes.

4. Cutting apparatus as claimed in claim 1 in which the support surface is located at right angles to a plane in which the limbs are relatively movable.

5. Cutting apparatus as claimed in claim 1 in which the support surface is oriented at an angle relative to a plane in which the limbs are relatively movable.

6. Cutting apparatus as claimed in claim 1 in which at least one connecting piece is pivotally attached to one of the two limbs at each end of said connecting piece.

7. Cutting apparatus as claimed in claim 1 in which two substantially parallel spaced connecting members are each pivotally attached at each of their ends to a limb to define a pivoted parallelogram construction.

8. Cutting apparatus as claimed in claim 1 in which said connecting means comprise two transverse connecting pins carried on said one limb and slidably movable in guides provided on the other limb.

9. Cutting apparatus as claimed in claim 1 in which there is an angle of inclination of the end wall to the axis of the limbs.

10. Cutting apparatus as claimed in claim 1 in which the split end wall extends at about 45° to the axis of the limbs.

11. Cutting apparatus as claimed in claim 1 in which biasing means are embodied in the apparatus to urge the limbs mutually away from each other so that a counteracting force need be applied to operate the apparatus.

* * * * *